Aug. 29, 1939.   E. E. GREVE   2,171,176
OIL BATH ROTARY
Filed April 11, 1935   2 Sheets-Sheet 1
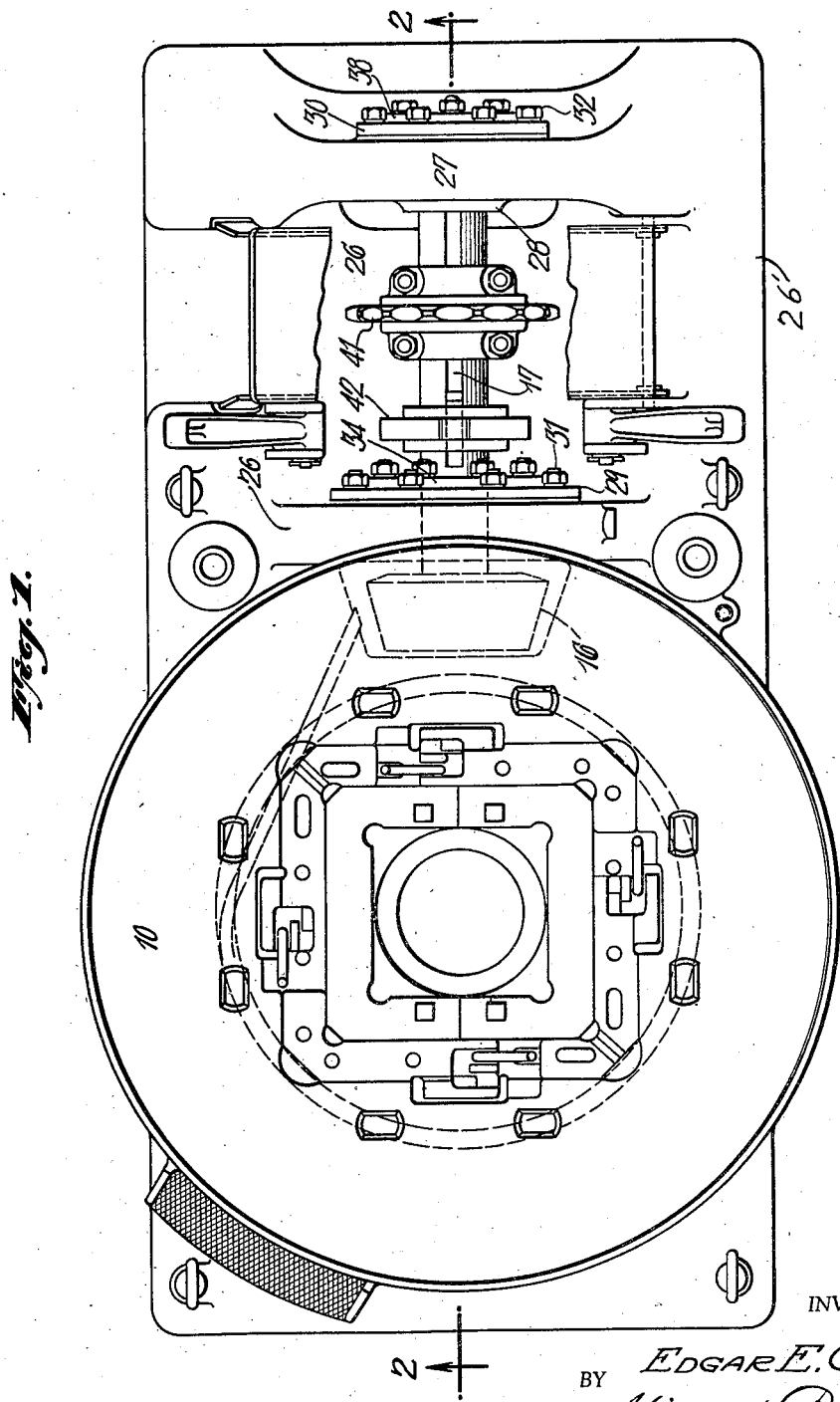
INVENTOR.
Edgar E. Greve.
BY
ATTORNEYS

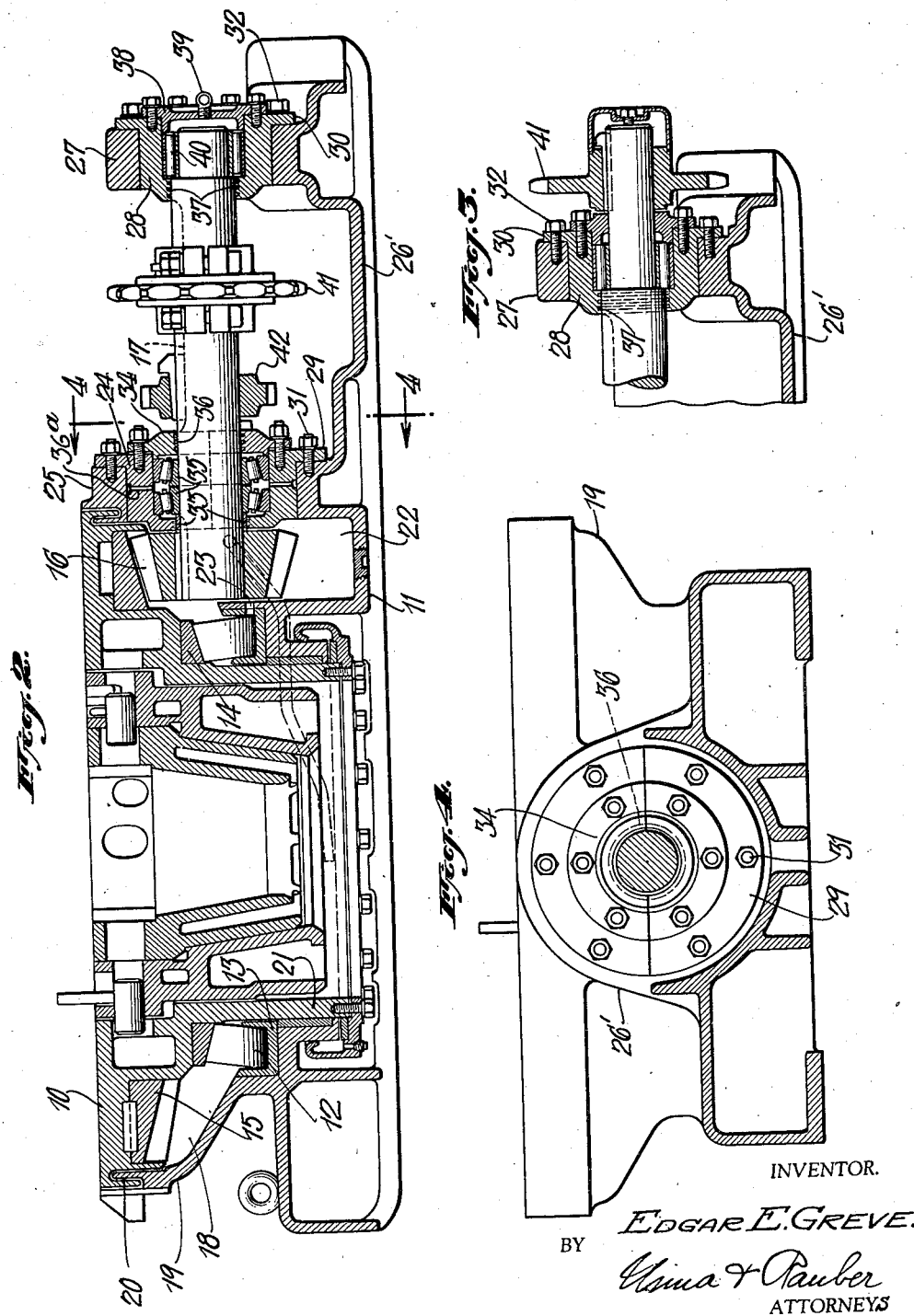

Patented Aug. 29, 1939

2,171,176

UNITED STATES PATENT OFFICE 2,171,176

OIL BATH ROTARY

Edgar E. Greve, Dallas, Tex., assignor to Oil Well Supply Company, Dallas, Tex., a corporation of New Jersey Application April 11, 1935, Serial No. 15,779

3 Claims. (Cl. 255—23)

My invention relates to rotaries which may be used in drilling oil wells and is so constructed that an arcuate alignment of the bearings is ensured without the necessity for shimming and in which the parts of the rotary are effectively lubricated.

This application is a continuation in part of my application Serial No. 523,756 filed March 19, 1931 now Patent No. 2,009,176.

Rotaries of the above type commonly comprise a rotating table supported through thrust bearings on a stationary base and driven by a pinion which meshes with gear teeth or gears mounted on the table. The pinion is mounted on a rotatable shaft journalled in suitable bearings.

Heretofore in mounting the driving shaft it has been customary to align it by the use of shims and the accurate alignment, therefore, depended upon the skill of the workmen. Where the shaft has been removed for inspection or repair and replaced in the field, such alignment is apt to be imperfect because of lack of facilities or lack of skill on the part of the workmen.

My invention provides a mounting for the driving shaft of rotaries in which the accurate alignment of the drive shaft is ensured without special shims or adjustments as the shaft is inserted in position, and also provides an effective means sealed from the entrance of dust or moisture for thoroughly lubricating the bearings of the shaft.

The various features of the invention are illustrated by way of example in the accompanying drawings, in which—

Fig. 1 is a plan view of a rotary embodying a preferred form of the invention.

Fig. 2 is a vertical section of the rotary taken on line 2—2 of Fig. 1.

Fig. 3 is a part plan view of a modified mounting for the drive shaft.

Fig. 4 is a vertical section taken on the line 4—4 of Fig. 2.

In the embodiment illustrated in the accompanying drawings the invention is shown as applied to a rotary in which the anti-friction thrust bearings for the rotary table and the gears and pinions for driving the latter are enclosed in a chamber which is partly filled with oil as described in detail in the parent application Serial No. 523,756, now Patent No. 2,009,176, of which the present application is a continuation in part.

In my present invention the drive shaft which extends radially into the oil containing chamber of the rotary, is mounted in a pair of spaced bearings carried in fixed supports on an integral extension of the base of the rotary. The oil containing chamber has an opening through which the drive shaft extends and the inner bearing for the drive shaft is mounted in this opening, while the outer bearing is mounted in spaced relation thereto. The opening for the inner bearing is preferably large enough to permit the insertion of the pinion mounted on the shaft, and the bearing support, or bearing itself, has an outside diameter sufficient to close and seal this opening. The bearing or bearing mounting is also provided with a flange through which it may be bolted to the wall of the oil chamber immediately surrounding the opening. The bolt holes for this purpose are so positioned that the insertion of the bolts therein accurately aligns the shaft and, therefore, avoids the necessity for any adjustment to secure alignment. Similarly, the outer bearing is mounted in a standard having an opening to receive and position the bearing for the outer end of the shaft. The bearing or bearing housing may be bolted to this standard in a manner similar to the securing of the inner bearing, and thus ensures an accurate alignment for the outer end of the shaft.

A drive sprocket for the drive shaft may be mounted either between bearings or on a shaft extension beyond the outer bearing.

In assembling the shaft, the bearings are mounted on the shaft and as the latter is inserted with its pinion, the bearing slide into the openings provided for them.

In the accompanying drawings the invention is disclosed as embodied in the oil bath rotary of parent application Serial No. 523,756, in which the rotary table 10 is rotatably mounted on a base 11 by means of an anti-friction thrust bearing comprising the rollers 12. The rollers 12 run on a lower raceway 13 and support an upper raceway 14 that directly supports the table 10. A bevel gear ring 15 is mounted on the lower face of the table 10 and meshes with a drive pinion 16 carried on a drive shaft 17. The anti-friction thrust bearings 12, 14, and the pinion 16 and gear 15 are all enclosed within an annular chamber 18 formed between the base 11 and the table 10 and enclosed by an outer wall 19 extending from the base 11 upwardly to the peripheral under surface of the table 10 with which it seals through a sliding seal 20. The inner wall of this annular oil chamber is formed by a skirt 21 depending downwardly from the table 10 and sealing into an opening in the base 11.

In this arrangement an oil reservoir 22 is provided into which the teeth of the pinion 16 dip so that lubricant is carried upwardly onto the teeth of the gear 15 from which it drips downwardly into the lower raceway 13 and back through an opening 23.

The wall 19 is provided near the reservoir 22 with an opening through which the shaft 17 extends and in which a bearing housing 24 for the shaft 17 may be mounted. The wall about this opening may be thickened somewhat as indicated at 25 in Fig. 2, and may be strengthened sidewise by means of abutments or standards 26 as indicated in Fig. 1. The opening is also of sufficiently large diameter to admit the insertion of the pinion 16 when the table 10 is removed or raised. The bearing housing 24 fits into the opening in the wall of the oil chamber and, therefore, has an outside diameter somewhat larger than the largest diameter of the pinion 16. The opening in the wall and the bearing housing 24 fit closely and are so positioned that when the bearing housing is inserted, the shaft 17 is properly aligned at its inner end and the pinion 16 is in position to mesh with the gear 15.

The base 11 extends integrally sidewise as at 26', or outward beyond the wall 19 below the shaft 17, and at its outer end is provided with an integral bearing standard 27 provided with an opening to receive a bearing housing 28. This bearing housing closely fits the opening through the standard 27 and is aligned with the opening through the wall 19 so as properly to align the outer end of the shaft 17.

The bearings housings 24 and 28 are provided with flanges 29 and 30, respectively, which fit against the outer surfaces of the wall 19 and the standard 27, respectively, and may be bolted thereto by means of bolts 31 and 32. These bolts pass into prepared bolt holes in the wall 19 and in the standard 27, respectively, to position the bearing housings 24 and 28. The inner surface of the housing 24 is provided with a seal 33 closing it tightly about the shaft 17 and sealing it from the oil chamber 18 and reservoir 22. The outer side of the bearing housing is sealed by means of a plate 34 so that the bearing is enclosed in a tightly sealed leak-proof chamber. The bearing within the housing 24 may be of any suitable type as, for example, a pair of roller bearings of reverse tapers to ensure against side thrust in either direction. The wall 34 is provided with a seal 36. The bearing housing is also provided with a lubricant supply duct 36a.

The inner side of the bearing housing 28 seals tightly against the shaft 17 at 37 and is closed on the opposite side by means of the closure plate 38 which is provided with a lubricant or grease duct 39 to fill the bearing housing. The bearings in the outer housing may be of any suitable type as, for example, the roller bearing 40 which need not support any thrusts of the shaft 17.

A drive sprocket 41 may be mounted on the shaft 17 between the bearing housings 24 and 28 as shown in Fig. 2, or may be mounted in an extension of the shaft 17 beyond the outer bearing housing 28 as shown in Fig. 3. A toothed collar 42 may also be provided between the bearing housings 24 and 28 to lock the shaft 17 from rotation by the usual or any suitable means. The flange 29 of the inner bearing housing 24 and the inner bearing housing and the closure plate 34 may be of larger dimensions than the outer bearing housing 28 and may, therefore, be of split construction as shown in Fig. 4, so that they may be removed from the shaft after being slid out of their positioning opening in the wall 18; or they may be arranged to be removed from the end of the shaft after removing the pinion 16, and the shaft afterwards drawn through the opening in the standard 27.

Through the above invention I have therefore provided a pair of spaced bearings for the pinion drive shaft which fit into recesses or openings integrally mounted on the base and therefore of fixed and unvarying position. Replacement of the bearings in their prepared openings and securing them in position therein ensures an accurate alignment of the shaft and pinion. This arrangement also permits the shaft to be withdrawn or partly withdrawn, together with the pinion mounted on it, so that it may be easily repaired or inspected. The bearings are also freely exposed for inspection and repair and for maintaining them effectively filled with lubricant. As their lubrication is independent of that in the chamber 18 and reservoir 22, a lubricant may be employed particularly adapted for the bearings independently of the requirements of lubricant for the pinion 16 and gear 15.

What I claim is:

1. In a rotary machine of the type used in drilling oil wells, the combination of: a base; a rotary table rotatably supported on said base; a pinion shaft; means whereby said pinion shaft rotates said rotary table; a cylindrical housing supported by said base; a bearing for rotatably supporting said pinion shaft; and a bearing retainer supported inside said cylindrical housing, said bearing retainer inclosing said bearing, said bearing retainer providing a lubricant chamber for said bearing, and said bearing retainer comprising two parts adapted to be secured together around said bearing after said bearing has been secured on said pinion shaft.

2. In a rotary machine of the type used in drilling oil wells, the combination of: a base; a rotary table rotatably supported on said base; a pinion shaft; means whereby said pinion shaft rotates said rotary table; a cylindrical housing supported by said base; a bearing for rotatably supporting said pinion shaft; and a bearing retainer supported inside said cylindrical housing, said bearing retainer inclosing said bearing, said bearing retainer providing a lubricant chamber for said bearing, and said bearing retainer comprising two parts adapted to be secured together around said bearing after said bearing has been secured on said pinion shaft, said parts providing a cylindrical wall adapted to support said bearing, and two side walls extending inwardly to said pinion shaft on opposite sides of said bearing and spaced therefrom so that said lubricant chamber is formed on opposite sides of said bearing.

3. In a rotary machine of the type used in drilling oil wells, the combination of: a base; a rotary table rotatably supported on said base; a pinion shaft; means whereby said pinion shaft rotates said rotary table; a cylindrical housing supported by said base; a bearing means including inner and outer races and bearing elements therebetween for rotatably supporting said pinion shaft; and a bearing retainer supported inside said cylindrical housing, said bearing retainer having inwardly extending walls for inclosing said bearing means, and said bearing retainer providing a lubricant chamber for said bearing.

EDGAR E. GREVE.